(12) United States Patent
Matsui et al.

(10) Patent No.: US 8,399,126 B2
(45) Date of Patent: Mar. 19, 2013

(54) NON-AQUEOUS ELECTROLYTE AND NON-AQUEOUS ELECTROLYTE SECONDARY BATTERY

(75) Inventors: Tooru Matsui, Osaka (JP); Tetsuo Nanno, Osaka (JP)

(73) Assignee: Panasonic Corporation, Osaka (JP)

( * ) Notice: Subject to any disclaimer, the term of this patent is extended or adjusted under 35 U.S.C. 154(b) by 651 days.

(21) Appl. No.: 12/619,242

(22) Filed: Nov. 16, 2009

(65) Prior Publication Data

US 2010/0124708 A1    May 20, 2010

(30) Foreign Application Priority Data

Nov. 17, 2008   (JP) ................................. 2008-293558

(51) Int. Cl.
*H01M 6/04*     (2006.01)

(52) U.S. Cl. ........ 429/199; 429/200; 429/330; 429/331; 429/332; 429/333; 429/335; 429/341; 429/249; 429/254; 252/62.2

(58) Field of Classification Search .................. 429/199, 429/200, 330, 331, 332, 333, 335, 341, 249, 429/254; 252/62.2
See application file for complete search history.

(56) References Cited

U.S. PATENT DOCUMENTS

2007/0054186 A1    3/2007   Costello et al.

FOREIGN PATENT DOCUMENTS

| JP | 11-026015 | * | 1/1999 |
| JP | 2004-281185 | * | 10/2004 |
| WO | WO 2008/078626 A1 | | 7/2008 |

OTHER PUBLICATIONS

Chinese Office Action issued in Chinese Patent Application No. CN 200910224520.X dated Oct. 21, 2011.

* cited by examiner

*Primary Examiner* — Laura Weiner
(74) *Attorney, Agent, or Firm* — McDermott Will & Emery LLP

(57) ABSTRACT

A non-aqueous electrolyte is provided that includes a non-aqueous solvent and an electrolyte salt, wherein the non-aqueous solvent contains a fluorinated ether (1) represented by the following Formula: $HCF_2CF_2CF_2CH_2-O-CF_2CF_2H$ (1). This non-aqueous electrolyte has good wettability to a polyolefin separator, can provide a battery with excellent load characteristics for a long period, does not easily decompose in the battery under high-temperature storage, and causes little gas generation due to decomposition. Furthermore, a non-aqueous electrolyte secondary battery is provided that includes a positive electrode, a negative electrode, a separator, and the above-described non-aqueous electrolyte.

14 Claims, 1 Drawing Sheet

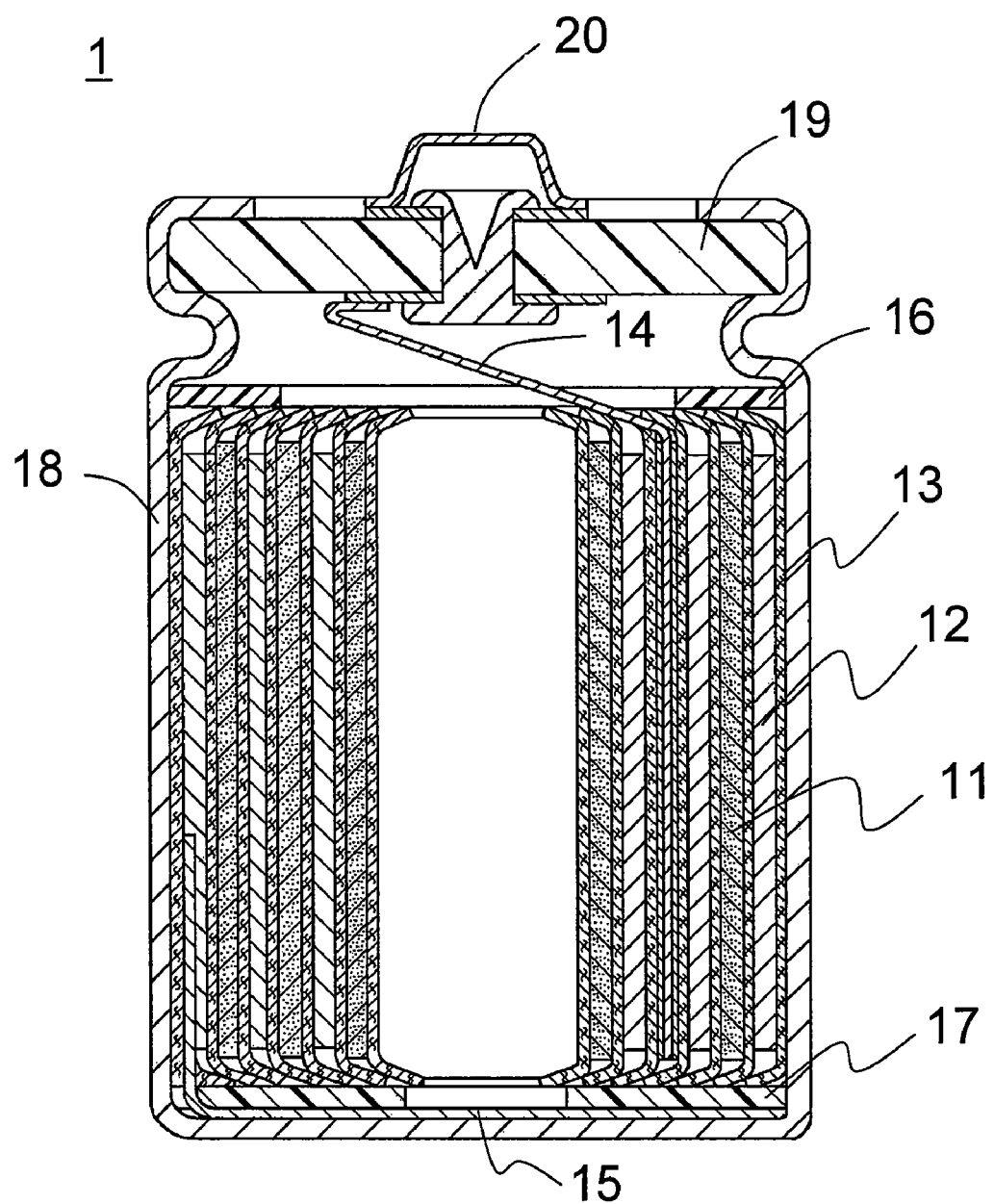

NON-AQUEOUS ELECTROLYTE AND NON-AQUEOUS ELECTROLYTE SECONDARY BATTERY

FIELD OF THE INVENTION

The present invention relates to a non-aqueous electrolyte and a non-aqueous electrolyte secondary battery. More particularly, the present invention relates mainly to an improvement of a non-aqueous solvent.

BACKGROUND OF THE INVENTION

Conventionally, non-aqueous electrolyte secondary batteries that use a transition metal oxide as a positive electrode active material and a layered carbon compound as a negative electrode active material have been developed. As the transition metal oxide, lithium cobalt oxide ($LiCoO_2$), lithium nickel oxide ($LiNiO_2$), lithium manganese oxide ($LiMn_2O_4$), lithium iron phosphate ($LiFePO_4$) and the like are used. As the layered carbon compound, artificial graphite, natural graphite and the like are used.

In general, non-aqueous electrolyte secondary batteries have a tendency to exhibit good characteristics during the initial period of use, but the characteristics gradually degrade with repeated charging and discharging. Therefore, there is a demand for a highly reliable non-aqueous electrolyte secondary battery capable of maintaining good characteristics for a long period. Examples of the indices of the reliability of non-aqueous electrolyte secondary batteries include cycle life characteristics, high-temperature storage characteristics and load characteristics. Side reactions that occur at a contact surface between the positive electrode and the non-aqueous electrolyte (hereinafter, referred to as a "positive electrode interface"), and a contact surface between the negative electrode and the non-aqueous electrolyte (hereinafter, referred to as a "negative electrode interface") affect these characteristics. The ion diffusivity in the non-aqueous electrolyte also affects these characteristics. Thus, the non-aqueous electrolyte affects the reliability of the non-aqueous electrolyte secondary battery.

A non-aqueous electrolyte contains a lithium salt and a non-aqueous solvent. As the non-aqueous solvent, for example, cyclic carbonates such as ethylene carbonate (EC) and propylene carbonate (PC), linear carbonates such as dimethyl carbonate (DMC), diethyl carbonate (DEC) and ethyl methyl carbonate (EMC) are widely used.

Cyclic carbonates dissolve and dissociate a lithium salt into ions, thereby imparting the non-aqueous electrolyte with ion conductivity. More specifically, $LiPF_6$, for example, is dissociated into a $Li^+$ ion and a $PF_6^-$ ion. However, cyclic carbonates are disadvantageous in that they have high viscosity and have low wettability to polyolefin separators. On the other hand, linear carbonates have low viscosity and have excellent wettability to separators. For this reason, a mixed solvent of a cyclic carbonate and a linear carbonate that overcomes the disadvantage of the cyclic carbonate is widely used as a non-aqueous solvent.

When a non-aqueous electrolyte secondary battery is stored at a high temperature, a mixed solvent of a cyclic carbonate and a linear carbonate occasionally generates a gas. The reason is that the linear carbonate is decomposed at the negative electrode interface in the initial period of high-temperature storage, which triggers a chain of decompositions through the non-aqueous electrolyte both at the positive electrode interface and the negative electrode interface.

As a technology for solving such a problem, for example, U.S. Patent Application Publication No. 2007/0054186 (hereinafter, referred to as "Patent Document 1") discloses a fluorinated ether (2a) represented by the following Formula (2a):

$$CF_3CFHCF_2CH(CH_3)-O-CF_2CFHCF_3 \quad (2a).$$

Patent Document 1 discloses that a lithium ion conductive coating is formed at a negative electrode interface when the fluorinated ether (2a) is added to a non-aqueous solvent mainly composed of a linear carbonate. This seems to suppress the decomposition of the linear carbonate at the negative electrode interface. However, in order to sustain this effect for a long period, it is necessary to set the content of the fluorinated ether (2a) to about 20 mol % of the total amount of the non-aqueous solvent. A secondary battery that uses a non-aqueous solvent mainly composed of a linear carbonate and containing 20 mol % of the fluorinated ether (2a) has the problem of having low load characteristics.

On the other hand, Japanese Laid-Open Patent Publication No. Hei 11-026015 (hereinafter, referred to as "Patent Document 2") discloses a non-aqueous electrolyte containing a fluorinated ether (A) represented by the following Formula:

$$HCF_2CF_2CH_2-O-CF_2CF_2H \quad (A).$$

Patent Document 2 discloses a non-aqueous solvent mainly composed of a cyclic carbonate and in which the content of a linear carbonate has been reduced by adding the fluorinated ether (A). Patent Document 2 discloses that the battery load characteristics are improved by setting the content of the fluorinated ether (A) to 20 mol % or more of the total amount of the non-aqueous solvent.

BRIEF SUMMARY OF THE INVENTION

It is an object of the present invention to provide a non-aqueous electrolyte secondary battery that includes a non-aqueous electrolyte having excellent wettability to a polyolefin separator, and that has excellent load characteristics with reduced gas generation.

One aspect of the present invention is directed to a non-aqueous electrolyte including a non-aqueous solvent and a lithium salt, wherein the non-aqueous solvent contains a fluorinated ether (1) represented by Formula:

$$HCF_2CF_2CF_2CH_2-O-CF_2CF_2H \quad (1).$$

Another aspect of the present invention is directed to a non-aqueous electrolyte secondary battery including: a positive electrode containing a positive electrode active material; a negative electrode containing a negative electrode active material; a separator interposed between the positive electrode and the negative electrode; and the above-described non-aqueous electrolyte.

While the novel features of the invention are set forth particularly in the appended claims, the invention, both as to organization and content, will be better understood and appreciated, along with other objects and features thereof, from the following detailed description taken in conjunction with the drawing.

BRIEF DESCRIPTION OF THE DRAWING

FIG. 1 is a vertical cross-sectional view schematically showing the configuration of a cylindrical non-aqueous electrolyte secondary battery according to a first embodiment of the present invention.

DETAILED DESCRIPTION OF THE INVENTION

[Non-Aqueous Electrolyte]

A non-aqueous electrolyte of this embodiment includes a non-aqueous solvent containing a fluorinated ether (1) represented by the following Formula:

$$HCF_2CF_2CF_2CH_2—O—CF_2CF_2H \quad (1)$$

and a lithium salt. Further, the non-aqueous electrolyte includes, as needed, at least one selected from the group consisting of a cyclic carbonate, a linear carbonate, a cyclic ester, a linear ester, and a fluorinated ether other than the fluorinated ether (1).

The present inventors carried out intensive studies in order to achieve the objects of the present invention. During the process of these studies, they focused attention on the fluorinated ether (1). The fluorinated ether (1) is a linear ether in which a 1,2-tetrafluoroethyl group and a 2,3,4-hexafluorobutyl group are bonded to an oxygen atom.

The fluorinated ether (1) has an ability to improve the wettability of a non-aqueous solvent to a polyolefin separator (hereinafter, this may simply be referred to as "wettability"). In particular, when the fluorinated ether (1) is added to a non-aqueous electrolyte mainly composed of a cyclic carbonate, the wettability is markedly improved.

Further, the fluorinated ether (1) is chemically stable; therefore, it will not produce a large amount of gas even if it is stored at a high temperature of about 85° C. for a long period. This results in the suppression of degradation in battery performance, such as in the output characteristics and cycle characteristics, and preventing swelling of the battery, for example.

In addition, the fluorinated ether (1) also has an ability to form a protective film on the negative electrode. The fluorinated ether (1) contains many fluorine atoms in its molecules, which have a large electronegativity, and therefore can reductively decompose easily at the negative electrode interface. When the fluorinated ether (1) is added to a non-aqueous electrolyte containing a linear carbonate, the fluorinated ether (1) reductively decomposes at the negative electrode interface, thereby forming a protective coating on the negative electrode. Forming the protective film on the negative electrode can suppress side reactions in the battery. This makes it possible, for example, to suppress the decomposition of a linear carbonate that may trigger a chain of decompositions in the non-aqueous electrolyte.

Further, the fluorinated ether (1) is chemically stable relative to a lithium salt such as $LiPF_6$. Therefore, it does not easily cause side reactions with lithium contained in the negative electrode active material, other than a reaction by which a protective coating is formed. For this reason, impurities that impede the charge/discharge reaction of lithium tend not to be produced. Accordingly, the fluorinated ether (1) has an ability to increase the battery cycle life.

In addition, the ability of the fluorinated ether (1) to form a protective coating is higher than that of the fluorinated ether (A). The reason seems to be that the number of fluorine atoms in one molecule of the fluorinated ether (1) is greater than the number of fluorine atoms in one molecule of the fluorinated ether (A). Accordingly, the fluorinated ether (1) can sufficiently form a protective coating with a lower amount of added than the fluorinated ether (A).

On the other hand, the ability of the fluorinated ether (1) to form a protective coating is lower than that of the fluorinated ether (2a). The reason seems to be that the number of fluorine atoms in one molecule of the fluorinated ether (1) is less than the number of fluorine atoms in one molecule of the fluorinated ether (2a). However, the fluorinated ether (2a) significantly reduces the battery load characteristics even if it is added in a small amount. The fluorinated ether (1) hardly reduces the battery load characteristics even if its content is high. The reason seems to be that the fluorinated ether (1) has a slight ability to dissolve and dissociate a lithium salt into ions, and also has low viscosity. The fluorinated ether (2a) does not dissolve a lithium salt at all, or it hardly dissolves a lithium salt.

The fluorinated ether (1) has high compatibility with a linear carbonate and a cyclic carbonate. Therefore, dissolving a lithium salt in a non-aqueous solvent mainly composed of a linear carbonate or a cyclic carbonate and containing the fluorinated ether (1) provides a single phase non-aqueous electrolyte.

A non-aqueous electrolyte in which a lithium salt is dissolved in a non-aqueous solvent that is a mixed solvent of the fluorinated ether (1) and a cyclic carbonate exhibits good wettability particularly to a polyolefin separator. The fluorinated ether (1) has relatively low viscosity, and thus improves the load characteristics of the non-aqueous electrolyte secondary battery. Furthermore, since the fluorinated ether (1) has a slight ability to dissolve and dissociate a lithium salt into ions, the good load characteristics of the battery can thus be maintained over a long period.

Specific examples of the cyclic carbonate include (fluoro) alkylene carbonates such as ethylene carbonate (EC), propylene carbonate (PC), 1,2-butylene carbonate, 2,3-butylene carbonate, 1,2-pentylene carbonate and fluoroethylene carbonate; and cyclic carbonates having a C=C unsaturated bond, such as vinylene carbonate, vinyl ethylene carbonate, divinyl ethylene carbonate, phenyl ethylene carbonate and diphenyl ethylene carbonate. These may be used alone, or in a combination of two or more of them.

Among these cyclic carbonates, EC and PC are preferable. EC is inactive with lithium contained in a negative electrode active material such as a carbon material, is chemically stable in a wide redox potential region, and also is capable of mediating a charge/discharge reaction. On the other hand, EC has a high melting point, is a solid in the room temperature range, and therefore is disadvantageous in that it cannot be used alone as a solvent component. PC has a high dielectric constant and a low melting point, and is chemically stable in a wide redox potential region. But it is disadvantageous in that it is reactive to a negative electrode active material such as a carbon material. By using EC and PC in combination, their disadvantages can negate each other.

In particular, in the case of a non-aqueous solvent mainly composed of a mixed solvent of EC and PC, a linear carbonate which may trigger a chain of decomposition reactions in the non-aqueous electrolyte is not used, or the amount of a linear carbonate can be reduced. The cycle efficiency of the negative electrode is improved, thereby increasing the cycle life of the battery. Also, gas generation in the battery due to high-temperature storage is significantly suppressed. Accordingly, by using a non-aqueous solvent mainly composed of a mixed solvent of EC and PC, it is possible to obtain a highly reliable non-aqueous electrolyte secondary battery having a long service life.

There is no particular limitation on the content of EC and PC in a non-aqueous electrolyte containing a mixed solvent of EC and PC. For example, the amounts of EC and PC may be appropriately selected, such that a mixed solvent containing EC, PC, a fluorinated ether and like forms a single phase.

As a specific example, the content of EC is 30 to 75 mol % of the total amount of EC and PC, and the remainder is PC. When the content of EC is too low, there is the possibility that the reaction between PC and the negative electrode active material may not be sufficiently suppressed. On the other hand, when the content of EC is too high, there is the possibility that the non-aqueous electrolyte may not form a single phase.

Particularly, it is preferable that the content (molar percent) of EC in the total amount of the non-aqueous solvent is equal to or greater than the content of PC. This makes it possible to sufficiently suppress the reaction between PC and the negative electrode active material, thereby suppressing degradation of the battery characteristics. Furthermore, the viscosity of the non-aqueous electrolyte can be sufficiently reduced, which results in good lithium ion diffusivity in the non-aqueous electrolyte.

Specific examples of the linear carbonate include alkyl carbonates such as dimethyl carbonate (DMC), ethyl methyl carbonate (EMC), diethyl carbonate (DEC), methyl propyl carbonate, methyl butyl carbonate, methyl pentyl carbonate, and linear carbonates having a C=C unsaturated bond, such as methyl vinyl carbonate, ethyl vinyl carbonate, divinyl carbonate, allyl methyl carbonate, allyl ethyl carbonate, diallyl carbonate, allyl phenyl carbonate and diphenyl carbonate. These may be used alone, or in a combination of two or more of them. Among these, DMC, EMC and DEC are preferable.

Specific examples of the cyclic ester include lactones such as γ-butyrolactone, α-methyl-γ-butyrolactone, γ-valerolactone, and cyclic esters having a C=C unsaturated bond such as furanone, 3-methyl-2(5H)-furanone and α-angelica lactone.

Specific examples of the linear ester include methyl propionate and methyl butyrate.

Further, examples of the fluorinated ethers other than the fluorinated ether (1) include fluorinated ethers (2) represented by the following Formulae (2a) to (2d).

  (2a)

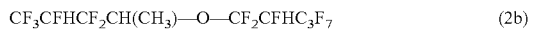  (2b)

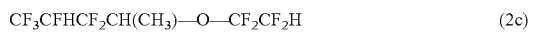  (2c)

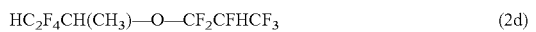  (2d)

The fluorinated ethers (2) may be used alone, or in a combination of two or more of them. Among the fluorinated ethers (2), the fluorinated ether (2a) represented by the Formula (2a) is preferable.

The fluorinated ether (1) does not have a methyl group in its molecules. For this reason, there is still room for improvement in the wettability-improving effect of the fluorinated ether (1). On the other hand, the fluorinated ether (2) has a methyl group in its molecules, and therefore provides high wettability to a polyolefin separator. Accordingly, by using the fluorinated ether (1) and a small amount of the fluorinated ether (2) in combination, it is possible to further improve the wettability of the non-aqueous electrolyte.

When the fluorinated ether (1) and the fluorinated ether (2) are used in combination, the consumption rate of the fluorinated ether (2) is reduced, so that it is possible to suppress reductive decomposition reactions of a linear carbonate at the negative electrode interface over a long period. Consequently, it is possible to improve the battery cycle life.

The content of the fluorinated ether (2), in the case that the fluorinated ether (1) and the fluorinated ether (2) are used in combination, is preferably 5 mol % or less, far preferably 2 mol % or less, with respect to the total amount of the non-aqueous solvent. When the content of the fluorinated ether (2) is too high, the battery load characteristics may be impaired.

The mixing ratio on each of the components will be described below.

As a non-aqueous electrolyte of this embodiment, (i) a non-aqueous solvent mainly composed of a cyclic carbonate or (ii) a non-aqueous solvent mainly composed of a linear carbonate is preferably used. A preferable mixing ratio of each of these will be described below.

A non-aqueous solvent mainly composed of a cyclic carbonate (i) means a non-aqueous solvent in which the content of the cyclic carbonate is 60 mol % or more of the total amount of the non-aqueous solvent.

The content of the fluorinated ether (1) in the non-aqueous solvent mainly composed of a cyclic carbonate (i) is preferably 3 to 15 mol % of the total amount of the non-aqueous solvent. When the content of the fluorinated ether (1) is too low, the wettability of the non-aqueous electrolyte to a polyolefin separator may be reduced. On the other hand, when the content of the fluorinated ether (1) is too high, the non-aqueous solvent may not form a single phase when plural types of cyclic carbonates are mixed.

When the fluorinated ether (1) and the fluorinated ether (2) are used in combination, the effect of the fluorinated ether (1) can be exerted even if the content of the fluorinated ether (1) is lower than the above-described range. In this case, the fluorinated ether (1) may be used at a content in the range of 0.5 to 2 mol %, and the fluorinated ether (2) may be used at a content in the range of 1 to 3 mol %.

The content of the cyclic carbonate in the non-aqueous solvent mainly composed of a cyclic carbonate (i) is preferably 85 to 97 mol %.

When a linear carbonate is used in combination in the non-aqueous solvent mainly composed of a cyclic carbonate (i), the amount of gas generation in the battery tends to increase during high-temperature storage if the content of the linear carbonate is too high. Therefore, the content of the linear carbonate in the non-aqueous solvent mainly composed of a cyclic carbonate (i) is preferably 10 mol % or less, far preferably, 5 mol % or less. In order to reduce the viscosity of the non-aqueous solvent mainly composed of a cyclic carbonate (i), it is preferable to add DEC, which is a linear carbonate.

A non-aqueous solvent mainly composed of a linear carbonate (ii) means a non-aqueous solvent in which the content of the linear carbonate is 50 mol % or more of the total amount of the non-aqueous solvent.

The content of the fluorinated ether (1) in the non-aqueous solvent mainly composed of a linear carbonate (ii) is preferably 5 to 25 mol %, far preferably 10 to 20 mol %, of the total amount of the non-aqueous solvent. When the content of the fluorinated ether (1) is too low, a protective coating may not be sufficiently formed at the negative electrode interface, and a large amount of gas may be generated in the battery during high-temperature storage. On the other hand, when the content of the fluorinated ether (1) is too high, the battery load characteristics may be insufficient.

When a cyclic carbonate is used in combination in the non-aqueous solvent mainly composed of a linear carbonate (ii), the content of the cyclic carbonate in the non-aqueous solvent mainly composed of a linear carbonate (ii) is preferably 5 to 25 mol %. When the content of the cyclic carbonate is too high, a large amount of gas may be generated in the battery during high-temperature storage.

As the lithium salt contained in the non-aqueous electrolyte of this embodiment, it is possible to use any lithium salt that is commonly used in the field of non-aqueous electrolyte secondary batteries, and examples thereof include $LiPF_6$, $LiBF_4$, $LiClO_4$, lithium bis[oxalate(2-)]borate (hereinafter, referred to as "LiBOB"), lithium bis[trifluoromethanesulfonyl]imide, lithium bis(pentafluoroethanesulfonyl)imide, lithium (trifluoromethanesulfonyl)(nonafluorobutanesulfonyl)imide, lithium cyclohexafluoropropane-1,3-bis(sulfonyl)imide, lithium trifluoromethyl trifluoroborate, lithium pentafluoroethyl trifluoroborate, lithium heptafluoropropyl trifluoroborate, lithium tris(pentafluoroethyl)trifluorophosphate and the like. These lithium salts may be used alone, or in a combination of two or more of them.

Among these lithium salts, LiBOB is preferable. For example, LiBOB acts as an additive for forming a protective coating at the negative electrode interface even if it is added in a very small amount.

The concentration of the lithium salt in the non-aqueous electrolyte is preferably 0.6 to 1.8 moles, vastly preferably 1.2 to 1.4 moles, per liter of the non-aqueous solvent.

The non-aqueous electrolyte of this embodiment can be prepared, for example, by dissolving a lithium salt in the non-aqueous solvent used in this embodiment.

The non-aqueous electrolyte of this embodiment can be suitably used for non-aqueous electrolyte secondary batteries such as lithium ion secondary batteries, which are required to have excellent load characteristics, high-temperature storage characteristics and cycle life characteristics.

[Non-Aqueous Electrolyte Secondary Battery]

A non-aqueous electrolyte secondary battery of this embodiment may have the same structure as that of a conventional non-aqueous electrolyte secondary battery, except that the above-described non-aqueous electrolyte is used. The non-aqueous electrolyte secondary battery of this embodiment includes, for example, a positive electrode, a negative electrode, a separator, and the above-described non-aqueous electrolyte.

The positive electrode includes a positive electrode current collector and a positive electrode active material layer.

As the positive electrode current collector, it is possible to use a porous or non-porous conductive substrate. Among these, a porous conductive substrate is preferable in view of the permeability of the non-aqueous electrolyte into an electrode group made up of a positive electrode, a negative electrode, and a separator. Examples of the porous conductive substrate include a mesh structure, a net structure, a punched sheet, a lath structure, a porous structure, a foamed structure, and molded fiber (e.g., nonwoven fabric). Examples of the non-porous conductive substrate include a foil, a sheet, and a film. Examples of the material of the conductive substrate include metal materials such as stainless steel, titanium, aluminum, and aluminum alloy. The thickness of the conductive substrate may be, but is not particularly limited to, about 5 to 50 μm.

The positive electrode active material layer is formed on one surface or both surfaces in the thickness direction of the positive electrode current collector. The positive electrode active material layer contains a positive electrode active material, further contains, as needed, a conductive agent, a binder and the like.

Examples of the positive electrode active material include lithium transition metal oxides such as lithium cobalt oxide, lithium nickel oxide, lithium manganese oxide and lithium iron phosphate; conductive polymer compounds such as polyacetylene, polypyrrole and polythiophene; and carbon materials such as activated carbon, carbon black, non-graphitizable carbon, artificial graphite, natural graphite, carbon nanotubes and fullerenes.

Among these positive electrode active materials, for example, lithium transition metal oxides release the lithium ions contained therein into the non-aqueous electrolyte during charging, and incorporate therein the lithium ions contained in the non-aqueous electrolyte during discharging. Carbon materials and conductive polymer compounds incorporate therein the anions contained in the non-aqueous electrolyte during charging, and release the anions contained therein into the non-aqueous electrolyte during discharging.

As the conductive agent, it is possible to use any conductive agent that is commonly used in the field of non-aqueous electrolyte secondary batteries, and examples thereof include graphites such as natural graphite and artificial graphite; carbon blacks such as acetylene black, Ketjen Black, channel black, furnace black, lamp black and thermal black; conductive fibers such as carbon fibers and metal fibers; metal powders such as aluminum powder; conductive whiskers such as a zinc oxide whisker and a conductive potassium titanate whisker; conductive metal oxides such as titanium oxide; and organic conductive materials such as a phenylene derivative. These conductive agents may be used alone, or in a combination of two or more of them.

As the binder, it is possible to use any binder that is commonly used in the field of non-aqueous electrolyte secondary batteries, and examples thereof include polyvinylidene fluoride, polytetrafluoroethylene, polyethylene, polypropylene, aramid resin, polyamide, polyimide, polyamide imide, polyacrylonitrile, polyacrylic acid, polymethyl acrylate, polyethyl acrylate, polyhexyl acrylate, polymethacrylic acid, polymethyl methacrylate, polyethyl methacrylate, polyhexyl methacrylate, polyvinyl acetate, polyvinyl pyrrolidone, polyether, polyethersulfone, polyhexafluoropropylene, styrene-butadiene rubber, modified acrylic rubber, carboxymethyl cellulose and the like. These binders may be used alone, or in a combination of two or more of them.

The positive electrode active material layer can be formed, for example, by applying a positive electrode material mixture slurry onto the surface of the positive electrode current collector, and drying and rolling the layer. The thickness of the positive electrode active material layer may be appropriately selected, and is preferably about 50 to 100 μm.

The positive electrode material mixture slurry can be prepared by dissolving or dispersing a positive electrode active material, and as needed, a conductive agent, a binder and the like in an organic solvent. As the organic solvent, it is possible to use dimethylformamide, dimethylacetamide, methyl formamide, N-methyl-2-pyrrolidone, dimethylamine, acetone, and cyclohexanone, for example.

The negative electrode includes a negative electrode current collector and a negative electrode active material layer.

As the negative electrode current collector, it is possible to use a porous or non-porous conductive substrate. Among these, a porous conductive substrate is preferable in view of the permeability of the non-aqueous electrolyte into an electrode group made up of a positive electrode, a negative electrode, and a separator. Examples of the porous conductive substrate include a mesh structure, a net structure, a punched sheet, a lath structure, a porous structure, a foamed structure, and molded fiber (e.g., nonwoven fabric). Examples of the non-porous conductive substrate include a foil, a sheet, and a film. Examples of the material of the conductive substrate include metal materials such as stainless steel, nickel, copper, and copper alloy. The thickness of the conductive substrate may be, but is not particularly limited to, about 5 to 50 μm.

The negative electrode active material layer is formed on one surface or both surfaces in the thickness direction of the negative electrode current collector. The negative electrode active material layer contains a negative electrode active material, further contains, as needed, a thickener, a conductive agent, a binder and the like.

Examples of the negative electrode active material include lithium metal, carbon materials, conductive polymer compounds, lithium-containing transition metal oxides, metal oxides that decompose into lithium oxide and a metal through reaction with lithium, and alloy-based negative electrode active materials. The alloy-based negative electrode active material is a substance that forms an alloy with lithium, thereby adsorbing lithium therein, and also reversibly adsorbs and desorbs lithium at the negative electrode potential.

Examples of carbon materials include carbon black, non-graphitizable carbon, artificial graphite and natural graphite whose surface is coated with an amorphous carbonaceous material, carbon nanotubes and fullerenes. Examples of the conductive polymer compounds include polyacetylene and polyparaphenylene. Examples of lithium-containing transition metal oxides include $Li_4Ti_5O_{12}$. Examples of metal oxides that decompose into lithium oxide and a metal through reaction with lithium include CoO, NiO, MnO, and $Fe_2O_3$.

Examples of alloy-based negative electrode active materials include metals capable of forming an alloy with lithium and substances that contain a metal capable of forming an alloy with lithium and oxygen. Specific examples of metals capable of forming an alloy with lithium include Ag, Au, Zn, Al, Ga, In, Si, Ge, Sn, Pb, and Bi. Specific examples of the substances that contain a metal capable of forming an alloy with lithium and oxygen include silicon oxides and tin oxides.

Among these negative electrode active materials, a negative electrode active material that adsorbs lithium ions during charging and desorbs lithium ions during discharging is preferable. More specifically, a carbon material, an alloy-based negative electrode active material and the like are preferable. When such a negative electrode active material is used, a lithium oxide coating is formed on the surface of the negative electrode upon initial charging. Then, the reductive decomposition of fluorinated ethers (1) and (2) progresses gradually, and the effect of the fluorinated ethers (1) and (2) in repairing the protective coating is exerted over a long period. As a result, the cycle life characteristics of the non-aqueous electrolyte secondary battery are further improved.

Of the carbon material and the alloy-based negative electrode active material, the alloy-based negative electrode active material is further preferable, and substances that contain an element capable of forming an alloy with lithium and oxygen, i.e., oxides such as silicon oxides and tin oxides are particularly preferable.

The negative electrode active material layer can be formed, for example, by applying a negative electrode material mixture slurry onto the surface of the negative electrode current collector, drying, and rolling the layer. The thickness of the negative electrode active material layer may be appropriately selected, and is preferably about 50 to 100 μm. The negative electrode material mixture slurry can be prepared by dissolving or dispersing a negative electrode active material, and as needed, a conductive agent, a binder, a thickener and the like in an organic solvent or water. As the conductive agent, the binder and the organic solvent, it is possible to use those used for preparing the positive electrode material mixture slurry. Examples of the thickener include carboxymethyl cellulose.

When lithium metal is used as the negative electrode active material, the negative electrode active material layer can be formed, for example, by pressure-bonding a thin plate of the lithium metal to the negative electrode current collector. When an alloy-based negative electrode active material is used as the negative electrode active material, the negative electrode active material layer can be formed by vacuum evaporation, sputtering, chemical vapor deposition, or the like.

The separator is provided so that it is interposed between the positive electrode and the negative electrode, thereby providing electrical insulation between the positive electrode and the negative electrode. As the separator, a sheet or a film having a predetermined ion permeability, mechanical strength, insulating properties and the like can be used. Specific examples of the separator include a porous sheet or a porous film such as a microporous film, woven fabric, or nonwoven fabric. The microporous film may be either a single layer film or a multi layer film (composite film). As needed, a microporous film, woven fabric, nonwoven fabric or the like may be stacked in two or more layers to form a separator.

The separator can be formed with various resin materials. Among such resin materials, polyolefins such as polyethylene and polypropylene are preferable in view of durability, shut-down function, battery safety, and the like. Here, a shut-down function is a function by which through holes are choked at the time of abnormal heat generation in a battery, thereby suppressing ion permeation and interrupting the battery reaction. The thickness of the separator is generally 5 to 300 μm, preferably 10 to 40 μm, greatly preferably 10 to 20 μm. The porosity of the separator is preferably 30 to 70%, far preferably 35 to 60%. The "porosity" is the percentage of the total volume of the through holes present in the separator with respect to the volume of the separator.

In the non-aqueous electrolyte secondary battery of this embodiment, an electrode group that is produced by interposing the separator between the positive electrode and the negative electrode may be of a stacked type or a wound type. The non-aqueous electrolyte secondary battery of this embodiment can be fabricated in various shapes. For example, the non-aqueous electrolyte secondary battery of this embodiment may be fabricated as a square battery, a cylindrical battery, a coin-shaped battery, and a metal laminate film-type battery.

FIG. 1 is a vertical cross-sectional view schematically showing the configuration of a cylindrical non-aqueous electrolyte secondary battery 1 according to one embodiment of the present invention. The non-aqueous electrolyte secondary battery 1 is a cylindrical battery that includes a positive electrode 11, a negative electrode 12, a separator 13, a positive electrode lead 14, a negative electrode lead 15, an upper insulating plate 16, a lower insulating plate 17, a battery case 18, a sealing plate 19, a positive electrode terminal 20, and the above-described non-aqueous electrolyte.

The separator 13 is interposed between the positive electrode 11 and the negative electrode 12, and the whole structure is spirally wound, thereby forming a wound-type electrode group. The material of the positive electrode lead 14 may be aluminum, for example. The material of the negative electrode lead 15 may be nickel, for example.

The upper insulating plate 16 and the lower insulating plate 17 are resin members that are attached to opposite ends in the longitudinal direction of the wound-type electrode group, thereby providing electrical insulation for the other members of the wound-type electrode group. The battery case 18 is a bottomed cylindrical container in which one longitudinal end is open, and the other longitudinal end forms the bottom. The material of the battery case 18 may be iron, stainless steel, or the like, for example. Plating such as nickel plating is formed on the surface of the battery case 18. The sealing lid 19 is made of resin, and supports the positive electrode terminal 20. The positive electrode terminal 20 is formed of a metal material such as iron or stainless steel.

The cylindrical non-aqueous electrolyte secondary battery 1 can be fabricated, for example, in the following manner. First, one end of the positive electrode lead 14 and one end of the negative electrode lead 15 are connected to predetermined positions of the wound-type electrode group. Next, the wound-type electrode group in which the upper insulating plate 16 and the lower insulating plate 17 are respectively attached to the longitudinal opposite ends is housed in the battery case 18.

At the same time, the other end of the positive electrode lead 14 is connected to the positive electrode terminal 20. The other end of the negative electrode lead 15 is connected to the inner surface of the bottom of the battery case 18. Then, the above-described non-aqueous electrolyte is injected into the battery case 18. The sealing lid 19, which supports the positive electrode terminal 20, is attached to the opening of the battery case 18. Then, the end of the battery case 18 along the side of its opening is crimped toward the sealing lid 19, thereby sealing the battery case 18. Thus, the non-aqueous electrolyte secondary battery 1 can be obtained.

The non-aqueous electrolyte secondary battery of this embodiment can be used for the same applications as those of conventional non-aqueous electrolyte secondary batteries, and is particularly useful as a power source for portable electronic equipment such as personal computers, mobile phones, mobile equipment, personal digital assistants (PDAs), video cameras, portable game consoles, and the like. Furthermore, the non-aqueous electrolyte secondary battery of this embodiment can be expected to be used, for example, as a secondary battery that assists the driving of an electric motor in hybrid electric vehicles, electric vehicles, fuel-cell powered vehicles and the like, a power source for driving power tools, vacuum cleaners, robots and the like, and a power source for plug-in HEVs.

EXAMPLE

Hereinafter, the present invention will be described specifically by way of examples and comparative examples.

Example 1

[Preparation of Single Phase Non-Aqueous Electrolyte and Evaluation of Wettability to Polyolefin Separator]

Non-aqueous solvents selected from the fluorinated ether (1) (abbreviated as "ether (1)" in the following Tables 1 to 8), EC, PC and DMC were used at the content (mol %) listed in Table 1 to prepare mixed solvents. All the resulting mixed solvents were single phase solutions.

Next, 1 mole (151.9 g) of $LiPF_6$ was dissolved in 1 liter each of the resulting mixed solvents to prepare non-aqueous electrolytes. All the resulting non-aqueous electrolytes were single phase solutions.

A polyethylene separator was immersed in the thus obtained non-aqueous electrolytes, and the wettability to the separator (described simply as "wettability" in Tables 1 and 2) was evaluated. As for the wettability, it was determined to be "wet" when the separator became translucent as a result of putting a few drops of the non-aqueous electrolyte thereon, and it was determined to be "not wet" when the separator repelled the non-aqueous electrolyte and thus remained white as a result of putting a few drops of the non-aqueous electrolyte thereon.

TABLE 1

| | Compositions of Mixed Solvents | Wettability |
|---|---|---|
| (a) | EC/ether (1)/DMC = 10/40/50 | Wet |
| (b) | EC/ether (1)/DMC = 10/25/65 | Wet |
| (c) | EC/ether (1)/DMC = 10/10/80 | Wet |
| (d) | EC/ether (1)/DMC = 10/5/85 | Wet |
| (e) | EC/ether (1)/DMC = 10/3/87 | Wet |
| (f) | EC/PC/ether (1)/DMC = 5/15/10/70 | Wet |
| (g) | EC/PC/ether (1)/DMC = 10/10/10/70 | Wet |
| (h) | EC/PC/ether (1)/DMC = 15/5/10/70 | Wet |
| (i) | EC/PC/ether (1) = 42.5/42.5/15 | Wet |
| (j) | EC/PC/ether (1) = 45/45/10 | Wet |
| (k) | EC/PC/ether (1) = 23.75/71.25/5 | Wet |
| (l) | EC/PC/ether (1) = 47.5/47.5/5 | Wet |
| (m) | EC/PC/ether (1) = 71.25/23.75/5 | Wet |
| (n) | EC/PC/ether (1) = 48.5/48.5/3 | Wet |
| (o) | EC/PC/ether (1) = 49/49/2 | Not wet |
| (p) | EC/PC/ether (1) = 49.5/49.5/1 | Not wet |

From Table 1, it is clear that when the non-aqueous electrolyte contains DMC, which is a linear carbonate, the electrolyte exhibits good wettability to the polyolefin separator for all of the compositions. It is also clear that when the non-aqueous electrolyte contains a mixed solvent of EC and PC and the content of the fluorinated ether (1) is 3 mol % or more, it exhibits good wettability to the polyolefin separator.

Example 2

[Effect of Non-Aqueous Electrolytes Containing EC and PC in Increasing Wettability to Polyolefin Separator]

The fluorinated ether (1), the fluorinated ether (2a) (abbreviated as "ether (2a)" in Tables 2 to 8), EC and PC were used at the content (mol %) listed in Table 2 as non-aqueous solvents to prepare mixed solvents. 1 mole (151.9 g) of $LiPF_6$ was dissolved in 1 liter each of the mixed solvents to prepare non-aqueous electrolytes. All the resulting non-aqueous electrolytes were single phase solutions. A polyethylene separator was immersed in the thus obtained non-aqueous electrolytes, and the wettability was evaluated. The results are shown in Table 2.

TABLE 2

| | Compositions of Mixed Solvents | Wettability |
|---|---|---|
| (q) | EC/PC/ether (1)/ether (2a) = 47.5/47.5/2/3 | Wet |
| (r) | EC/PC/ether (1)/ether (2a) = 48.5/48.5/2/2 | Wet |
| (s) | EC/PC/ether (1)/ether (2a) = 49/49/1/1 | Wet |
| (t) | EC/PC/ether (1)/ether (2a) = 49.45/49.45/1/0.1 | Not wet |

From Table 2, it is clear that the non-aqueous electrolytes containing EC, PC, the fluorinated ether (1) and the fluorinated ether (2a) exhibit good wettability to the polyolefin separator, even if the content of the fluorinated ether (1) is 1 mol %. When the content of fluorinated ether (1) is 1 mol %, and the content of the fluorinated ether (2a) was 0.1 mol %, the wettability of the non-aqueous electrolyte to the polyolefin separator is not sufficiently improved. This is presumably because the content of the fluorinated ether (1) or (2a) was too low.

Example 3

[Load Characteristics of Secondary Batteries that Include Non-Aqueous Electrolytes Containing Non-Cyclic Carbonate]

(1) Preparation of Non-Aqueous Electrolyte

Non-aqueous electrolytes (a) to (h) were prepared in the same manner as in Example 1.

(2) Production of Positive Electrode 93 parts by mass of $LiNi_{0.8}CO_{0.13}Al_{0.07}O_2$ powder (a positive electrode active material), 3 parts by mass of acetylene black (a conductive material) and 4 parts by mass of polyvinylidene fluoride (a binder) were mixed. The resulting mixture was dissolved or dispersed in anhydrous N-methyl-2-pyrrolidone to prepare a positive electrode material mixture slurry. This positive electrode material mixture slurry was applied onto the surface of a 15 μm-thick aluminum foil (a positive electrode current collector), dried and rolled, to form a 70 μm-thick positive electrode active material layer, thereby producing a positive electrode sheet. The positive electrode sheet was cut out to a size of 35 mm×35 mm, and this was used as a positive electrode, which was then bonded to an aluminum plate provided with a positive electrode lead by ultrasonic welding.

(3) Production of Negative Electrode

A 300 μm-thick lithium foil was cut out to a size of 35 mm×35 mm, and this was used as a negative electrode, which was then pressure-bonded to a copper plate provided with a negative electrode lead.

(4) Production of Reference Electrode

A 300 μm-thick lithium foil was pressure-bonded to the tip of a 5 mm-wide nickel lead, and this was used as a reference electrode.

(5) Assembly of Batteries

A polyethylene separator was interposed between the positive electrode and the negative electrode, and the aluminum plate and the copper plate were fixed together with tape, thereby producing an electrode group. Then, the electrode group was housed in a battery case taking the form of a tubular aluminum laminate film bag open at both ends. The positive electrode lead and the negative electrode lead were guided to the outside from one of the openings of the battery case, and that opening was sealed by welding. Then, each of the non-aqueous electrolytes (a) to (h) of the present invention was added dropwise from the other opening into the battery case, and the reference electrode was inserted into each battery case. After the battery cases were degassed at 10 mmHg for 5 seconds, the other openings were sealed by welding. Thus, non-aqueous electrolyte secondary batteries were fabricated.

Using the batteries obtained as above, charging and discharging was repeated 5 times at 20° C. with a constant current of 4.5 mA. The upper limit of charging was set so that the positive electrode potential was 4.3 V with respect to the reference electrode. The lower limit of discharging was set so that the positive electrode potential was 2.5 V with respect to the reference electrode. The discharge capacity of each of the batteries after 5 cycles was approximately 47 mAh.

(6) Evaluation of Load Characteristics of Non-Aqueous Electrolyte Secondary Batteries Each battery was charged at 20° C. with a constant current of 4.5 mA so that the positive electrode potential was 4.3 V with respect to the reference electrode. Then, the charged battery was discharged at 20° C. with a constant current of 9.4 mA until the positive electrode potential reached 2.5 V with respect to the reference electrode. The discharge capacity at this time is referred to as the "0.2 C capacity".

Subsequently, after the battery was discharged with a constant current of 4.5 mA so that the positive electrode potential was 2.5 V with respect to the reference electrode, the battery was charged with a constant current of 4.5 mA so that the positive electrode potential was 4.3 V with respect to the reference electrode. Then, the charged battery was discharged with a constant current of 47 mA until the positive electrode potential reached 2.5 V with respect to the reference electrode. The discharge capacity at this time is referred to as the "1 C capacity". The load characteristics of the battery can be calculated from the following expression. Higher values for the load characteristics indicate better ion diffusivity in the battery, and in particular, in the positive electrode. The results are shown in Table 3.

Load characteristics=1 C capacity/0.2 C capacity

TABLE 3

| | Compositions of Mixed Solvents | Load Characteristics |
|---|---|---|
| (a) | EC/ether (1)/DMC = 10/40/50 | 0.820 |
| (b) | EC/ether (1)/DMC = 10/25/65 | 0.918 |
| (c) | EC/ether (1)/DMC = 10/10/80 | 0.922 |
| (d) | EC/ether (1)/DMC = 10/5/85 | 0.925 |
| (e) | EC/ether (1)/DMC = 10/3/87 | 0.926 |
| (f) | EC/PC/ether (1)/DMC = 5/15/10/70 | 0.918 |
| (g) | EC/PC/ether (1)/DMC = 10/10/10/70 | 0.920 |
| (h) | EC/PC/ether (1)/DMC = 15/5/10/70 | 0.920 |

From Table 3, it can be seen that the load characteristics of the non-aqueous electrolyte secondary batteries improve with reducing content of the fluorinated ether (1). When the content of the fluorinated ether (1) was 40 mol %, a decrease was observed in the load characteristics of the batteries, although not a major decrease. Since the amount of $LiPF_6$ dissolved into the fluorinated ether (1) is very small, the amount of $LiPF_6$ dissolved in EC or DMC increases and the degree of dissociation of $LiPF_6$ is reduced, with increasing content of the fluorinated ether (1) in the non-aqueous solvent. As a result, the diffusion resistance of lithium ions in the batteries increases. It seems that for this reason, the battery load characteristics are reduced with increasing content of the fluorinated ether (1). Therefore, the content of the fluorinated ether (1) is preferably 25 mol % or less in a non-aqueous electrolyte mainly composed of a linear carbonate.

Furthermore, it can be seen from the results for the non-aqueous electrolytes (f) to (g) that the battery load characteristics are improved when the EC content is equal to or greater than the PC content in the mixed solvent of EC and PC.

Example 4

[High-Temperature Storage Characteristics of Secondary Batteries that Include Non-aqueous Electrolyte Containing Non-Cyclic Carbonate]

(1) Preparation of Non-Aqueous Electrolyte

Non-aqueous electrolytes (a) to (h) were prepared in the same manner as in Example 1.

(2) Production of Positive Electrode

A positive electrode sheet was produced using $LiNi_{0.8}CO_{0.13}Al_{0.07}O_2$ as the positive electrode active material in the same manner as in Example 3. This positive electrode sheet was cut out to a size of 35 mm×35 mm, and bonded to an aluminum plate provided with a lead by ultrasonic welding, thereby producing a positive electrode.

(3) Production of Negative Electrode 98 parts by mass of artificial graphite powder (a negative electrode active material), 1 part by mass of modified styrenebutadiene-based latex (a binder) and 1 part by mass of carboxymethyl cellulose (a thickener) were mixed. The resulting mixture was dispersed in water to prepare a negative electrode material mixture slurry. This negative electrode material mixture slurry was applied onto the surface of a 10 μm-thick copper foil (a negative electrode current collector), dried and rolled, to form a 90 μm-thick negative electrode active material layer on the surface of the copper foil, thereby obtaining a negative electrode sheet. This negative electrode sheet was cut out to a size of 35 mm×35 mm, and bonded to a copper plate provided with a lead by ultrasonic welding, thereby producing a negative electrode.

(4) Assembly of Batteries

Non-aqueous electrolyte secondary batteries were fabricated in the same manner as in Example 3, except that the positive electrode and negative electrode obtained as described above were used, and that the reference electrode was not inserted. Using these batteries, charging and discharging was repeated 5 times at 20° C. with a constant current of 4.5 mA. The upper limit of charging was set so that the battery voltage was 4.2 V, and the lower limit of discharging was set so that the battery voltage was 2.5 V. The discharge capacity of each of the batteries after 5 cycles was approximately 46 mAh.

(5) High-Temperature Storage Characteristics of Batteries

Using the non-aqueous electrolyte secondary batteries obtained as described above, charging was performed at 20° C. with a constant current of 4.5 mA. After the voltage reached 4.2 V, the batteries were kept at that voltage for 12 hours. Although varying slightly depending on the compositions of the non-aqueous electrolytes, the open circuit voltage was 4.193 to 4.195 V. Then, the batteries in such charged states were stored at 85° C. for one day. The amount of gas generated in the batteries was measured by gas chromatography according to the calibration curve between the gas concentration and the amount of generated gas for each battery. The results are shown in Table 4.

TABLE 4

|     | Compositions of Mixed Solvents | Amount of Gas (ml) |
| --- | --- | --- |
| (a) | EC/ether (1)/DMC = 10/40/50 | 0.0202 |
| (b) | EC/ether (1)/DMC = 10/25/65 | 0.0203 |
| (c) | EC/ether (1)/DMC = 10/10/80 | 0.0206 |
| (d) | EC/ether (1)/DMC = 10/5/85 | 0.0211 |
| (e) | EC/ether (1)/DMC = 10/3/87 | 0.0623 |
| (f) | EC/PC/ether (1)/DMC = 5/15/10/70 | 0.0224 |
| (g) | EC/PC/ether (1)/DMC = 10/10/10/70 | 0.0217 |
| (h) | EC/PC/ether (1)/DMC = 15/5/10/70 | 0.0205 |

From Table 4, it can be seen that the amount of gas generated in the batteries due to high-temperature storage is significantly reduced when the fluorinated ether (1) in the non-aqueous solvents is 5 mol % or more. Considering the results of Tables 3 and 4 together, it can be seen that the content of the fluorinated ether (1) in the non-aqueous solvent for a non-aqueous electrolyte mainly composed of a linear carbonate is preferably in the range of 5 to 25 mol %.

Further, from the results for the non-aqueous electrolytes (f) to (g), it can be seen that gas generation in the batteries is suppressed when the EC content is equal to or greater than the PC content in the mixed solvent of EC and PC.

Example 5

[Cycle Characteristics of Secondary Battery that Includes Non-Aqueous Electrolyte Containing Linear Carbonate]

(1) Preparation of Non-Aqueous Electrolyte

A mixed solvent was prepared by mixing EC, the fluorinated ether (1) and DMC, such that the molar ratio was EC/fluorinated ether (1)/DMC=10/10/80. $LiPF_6$ was dissolved in this mixed solvent at a concentration of 1 mole/liter, thereby preparing a non-aqueous electrolyte.

(2) Assembly of Battery

A non-aqueous electrolyte secondary battery was fabricated in the same manner as in Example 4, except that the above-described non-aqueous electrolyte was used. Using the non-aqueous electrolyte secondary battery, charging and discharging was repeated at 20° C. with a constant current of 23 mA. The upper limit of charging was set so that the battery voltage was 4.2 V, and the lower limit of discharging was set so that the battery voltage was 2.5 V. The number of cycles at which the discharge capacity of the battery reached half the discharge capacity at the first cycle was measured as the cycle life. As a result, the cycle life was 313 cycles.

Example 6 and Comparative Examples 1 to 2

[Load Characteristics, High-Temperature Storage Characteristics and Cycle Life of Secondary Batteries that Include Non-Aqueous Electrolyte Containing Linear Carbonate]

(1) Preparation of Non-Aqueous Electrolyte

A mixed solvent was prepared by mixing EC, the fluorinated ether (1) and DMC, such that the molar ratio was Oct. 10, 1980. $LiPF_6$ was dissolved in this mixed solvent at a concentration of 1 mole/liter to prepare a non-aqueous electrolyte of Example 6.

A non-aqueous electrolyte of Comparative Example 1 was prepared in the same manner as in Example 6, except that the fluorinated ether (2a) was used in place of the fluorinated ether (1). A non-aqueous electrolyte of Comparative Example 2 was prepared in the same manner as in Example 6, except that the fluorinated ether (A) (abbreviated as "ether A" in the following table) was used in place of the fluorinated ether (1).

(2) Assembly of Batteries and Evaluation Thereof

Non-aqueous electrolyte secondary batteries for the evaluation of load characteristics were fabricated in the same manner as in Example 3, except that the non-aqueous electrolytes were changed to those prepared as described above. The battery load characteristics were evaluated using these batteries in the same manner as in Example 3. The results are shown in Table 5.

Non-aqueous electrolyte secondary batteries for the evaluation of high-temperature storage characteristics were fabricated in the same manner as in Example 4, except that the non-aqueous electrolyte was changed to those prepared as described above. The battery high-temperature storage characteristics were examined using these batteries in the same manner as in Example 4. The results are shown in Table 5.

Non-aqueous electrolyte secondary batteries for the evaluation of cycle characteristics were fabricated in the same manner as in Example 5, except that the non-aqueous electrolyte was changed to those prepared as described above. The battery cycle characteristics were examined using these batteries in the same manner as in Example 5. The results are shown in Table 5.

TABLE 5

| Compositions of Electrolytes | | Load Characteristics | Amount of Gas (ml) | Cycle Life |
|---|---|---|---|---|
| Ex. 6 | EC/ether (1)/DMC = 10/10/80 | 0.922 | 0.0206 | 313 |
| Com Ex. 1 | EC/ether (2a)/DMC = 10/10/80 | 0.833 | 0.0202 | 287 |
| Com Ex. 2 | EC/ether (A)/DMC = 10/10/80 | 0.923 | 0.0391 | 304 |

In Comparative Example 1, the fluorinated ether (2a) was used alone in place of the fluorinated ether (1). A reduction in the load characteristics was observed in the battery of Comparative Example 1. This is presumably because the lithium salt is difficult to dissolve and dissociate because of the complex chemical structure of the fluorinated ether (2a), thus reducing the ion conductivity of the non-aqueous electrolyte. In the battery of Comparative Example 1, a large concentration polarization occurred as a result of repeated charging and discharging, and a loss in the battery capacity occurred. Moreover, the cycle life was not sufficient.

In Comparative Example 2, the fluorinated ether (A) was used alone in place of the fluorinated ether (1). In the battery of Comparative Example 2, the amount of gas generated due to high-temperature storage was large, and the battery was susceptible to swelling and deformation, although the load characteristics were good. This is presumably because the fluorinated ether (A) has a smaller number of fluorine atoms per molecule than the fluorinated ether (1), and therefore had less effect in forming a protective coating at the negative electrode interface. In the battery of Comparative Example 2, after repeated charging and discharging, the gas generated by the reaction between the negative electrode and the non-aqueous electrolyte were accumulated in the battery. For this reason, the battery of Comparative Example 2 had a shorter cycle life than the battery of Example 6 of the present invention.

Example 7

[Load Characteristics of Secondary Batteries that Include Non-Aqueous Electrolyte Containing Cyclic Carbonate]

Non-aqueous electrolytes (i) to (n) were prepared in the same manner as in Example 1. Further, non-aqueous electrolytes (q) to (s) were prepared in the same manner as in Example 2. Non-aqueous electrolyte secondary batteries for the evaluation of load characteristics were fabricated in the same manner as in Example 3, except that these non-aqueous electrolytes were used.

Using the batteries obtained as described above, charging and discharging was repeated 5 times at 20° C. with a constant current of 4.5 mA. The upper limit of charging was set so that the positive electrode potential was 4.3 V with respect to the reference electrode. The lower limit of discharging was set so that the positive electrode potential was 2.5 V with respect to the reference electrode. The discharge capacity of each of the non-aqueous electrolyte secondary batteries after 5 cycles was approximately 46 mAh.

The load characteristics of the secondary batteries were evaluated in the same manner as in Example 3, except for the following changes. First, the constant current used in constant current discharging for determining the "0.2 C capacity" was changed from 9.4 mA to 9.2 mA. Further, the constant current used in constant current discharging for determining the "1 C capacity" was changed from 47 mA to 46 mA. From the thus obtained 0.2 C capacity and 1 C capacity, the load characteristics (1 C capacity/0.2 C capacity) were calculated. The results are shown in Table 6.

TABLE 6

| | Compositions of Mixed Solvents | Load Characteristics |
|---|---|---|
| (i) | EC/PC/ether (1) = 42.5/42.5/15 | 0.251 |
| (j) | EC/PC/ether (1) = 45/45/10 | 0.336 |
| (k) | EC/PC/ether (1) = 23.75/71.25/5 | 0.400 |
| (l) | EC/PC/ether (1) = 47.5/47.5/5 | 0.425 |
| (m) | EC/PC/ether (1) = 71.25/23.75/5 | 0.442 |
| (n) | EC/PC/ether (1) = 48.5/48.5/3 | 0.457 |
| (q) | EC/PC/ether (1)/ether (2a) = 47.5/47.5/2/3 | 0.298 |
| (r) | EC/PC/ether (1)/ether (2a) = 48.5/48.5/2/2 | 0.394 |
| (s) | EC/PC/ether (1)/ether (2a) = 49/49/1/1 | 0.424 |

From Table 6, it can be seen that the load characteristics of the non-aqueous electrolyte secondary batteries improve with reducing content of the fluorinated ether (1). It is clear that the batteries exhibit good load characteristics when the content of the fluorinated ether (1) is 10 mol % or less. Considering the results of Examples 1 and 7 together, it is clear that the content of the fluorinated ether (1) in the non-aqueous electrolytes mainly composed of a cyclic carbonate is preferably 3 to 10 mol % of the total amount of the non-aqueous solvent.

The load characteristics dropped for the non-aqueous electrolyte (q) presumably because the content of the fluorinated ether (2a) was too high, which resulted in insufficient wettability of the non-aqueous electrolyte (q) to the polyolefin separator. On the other hand, the load characteristics of the non-aqueous electrolytes (r) and (s) were good presumably because they had good wettability to the polyolefin separator. From these results, in order to improve the wettability to a polyolefin separator of a non-aqueous electrolyte mainly composed of cyclic carbonates, the content of the fluorinated ether (2a) is preferably 2 mol % or less.

Further, from the results for the non-aqueous electrolytes (k) and (m), it can be seen that the battery load characteristics improve when the EC content is higher than the PC content in the mixed solvent of EC and PC.

Example 8

[High-Temperature Storage Characteristics of Secondary Batteries that Include Non-Aqueous Electrolyte Containing Cyclic Carbonate]

Non-aqueous electrolytes (i) to (n) were prepared in the same manner as in Example 1. Further, non-aqueous electrolytes (q) to (s) were prepared in the same manner as in Example 2. A positive electrode was produced in the same manner as in Example 3. A negative electrode was produced in the same manner as in Example 4.

Non-aqueous electrolyte secondary batteries were fabricated in the same manner as in Example 4, except that the non-aqueous electrolytes (i) to (n) and (q) to (s) obtained as described above were used, that the positive electrode and negative electrode obtained as described above were used, and that the reference electrode was not inserted. Using these batteries, charging and discharging was repeated 5 times at 20° C. with a constant current of 4.5 mA. The upper limit of charging was set so that the battery voltage was 4.2 V, and the lower limit of discharging was set so that the battery voltage was 2.5 V. The discharge capacity of each of the batteries after 5 cycles was approximately 45 mAh.

(5) High-Temperature Storage Characteristics of Batteries

Using the non-aqueous electrolyte secondary battery obtained as described above, charging was performed at 20° C. with a constant current of 4.5 mA. After the voltage reached 4.2 V, the batteries were kept at that voltage for 12 hours. Although varying slightly depending on the compositions of the electrolytes, the open circuit voltage was 4.192 to 4.194 V. Then, the batteries in such charged states were stored at 85° C. for one day, and the amount of gas generated in the batteries was measured in the same manner as in Example 4. The results are shown in Table 7.

TABLE 7

|   | Compositions of Mixed Solvents | Amount of Gas (ml) |
|---|---|---|
| (i) | EC/PC/ether (1) = 42.5/42.5/15 | 0.008 |
| (j) | EC/PC/ether (1) = 45/45/10 | 0.010 |
| (k) | EC/PC/ether (1) = 23.75/71.25/5 | 0.014 |
| (l) | EC/PC/ether (1) = 47.5/47.5/5 | 0.012 |
| (m) | EC/PC/ether (1) = 71.25/23.75/5 | 0.009 |
| (n) | EC/PC/ether (1) = 48.5/48.5/3 | 0.013 |
| (q) | EC/PC/ether (1)/ether (2a) = 47.5/47.5/2/3 | 0.009 |
| (r) | EC/PC/ether (1)/ether (2a) = 48.5/48.5/2/2 | 0.010 |
| (s) | EC/PC/ether (1)/ether (2a) = 49/49/1/1 | 0.011 |

From the results shown in Tables 4 and 7, it can be seen that the amount of gas generated in the batteries due to high-temperature storage can be significantly reduced by using a cyclic carbonate and the fluorinated ether (1) in combination. It can also be seen that the effect of suppressing gas generation in the batteries can be further improved by including a cyclic carbonate as a main component and using the fluorinated ether (1) and the fluorinated ether (2a) in combination. Further, it can be seen that gas generation in the batteries can be further suppressed when the EC content is higher than the PC content in the mixed solvent of EC and PC.

Example 9

[Cycle Characteristics of Secondary Batteries that Include Non-Aqueous Electrolyte Containing Cyclic Carbonate]

A mixed solvent was prepared by mixing EC, PC and the fluorinated ether (1) at a molar ratio of 47.5/47.5/5. $LiPF_6$ was dissolved in this mixed solvent at a concentration of 1 mole/liter to prepare a non-aqueous electrolyte.

A non-aqueous electrolyte secondary battery was fabricated in the same manner as in Example 4, except that the above-described non-aqueous electrolyte was used. Using the non-aqueous electrolyte secondary batteries, charging and discharging was repeated at 20° C. with a constant current of 22.5 mA. The upper limit of charging was set so that the battery voltage was 4.2 V, and the lower limit of discharging was set so that the battery voltage was 2.5 V. The number of cycles at which the discharge capacity of the battery reached half the discharge capacity at the first cycle was measured as the cycle life. As a result, the cycle life was 273 cycles.

Example 10 and Comparative Example 3

[Load Characteristics, High-Temperature Storage Characteristics and Cycle Life of Secondary Batteries that Include Non-Aqueous Electrolyte Containing Cyclic Carbonate]

(1) Preparation of Non-Aqueous Electrolyte

A mixed solvent was prepared by mixing EC, PC and the fluorinated ether (1) at a molar ratio of 47.5/47.5/5. $LiPF_6$ was dissolved in this mixed solvent at a concentration of 1 mole/liter to prepare a non-aqueous electrolyte of Example 10. This non-aqueous electrolyte was the same as the non-aqueous electrolyte of Example 9.

A non-aqueous electrolyte of Comparative Example 3 was prepared in the same manner as described above, except that the fluorinated ether (A) was used alone in place of the fluorinated ether (1).

(2) Assembly of Batteries and Evaluation Thereof

Non-aqueous electrolyte secondary batteries for the evaluation of load characteristics were fabricated in the same manner as in Example 3, except that the non-aqueous electrolyte was changed to those prepared as described above. The battery load characteristics were examined using these batteries in the same manner as in Example 3. The results are shown in Table 8.

Further, non-aqueous electrolyte secondary batteries for the evaluation of high-temperature storage characteristics were fabricated in the same manner as in Example 4, except that the non-aqueous electrolytes were changed to those prepared as described above. The battery high-temperature storage characteristics were examined using these batteries in the same manner as in Example 4. The results are shown Table 8.

Further, non-aqueous electrolyte secondary batteries for the evaluation of cycle characteristics were fabricated in the same manner as in Example 5, except that the non-aqueous electrolytes were changed to those prepared as described above. The battery cycle characteristics were examined using these batteries in the same manner as in Example 5. The results are shown in Table 8.

TABLE 8

|  | Compositions of Electrolytes | Load Characteristics | Amount of Gas (ml) | Cycle Life Characteristics |
|---|---|---|---|---|
| Ex. 10 | EC/PC/ether (1) = 47.5/47.5/5 | 0.425 | 0.012 | 273 |
| Com. Ex. 3 | EC/PC/ether (A) = 40/40/20 | 0.425 | 0.017 | 204 |

The fluorinated ether (1) was used in Example 10. The fluorinated ether (A) was used alone in Comparative Example 3. The load characteristics of the battery of Comparative Example 3 were equivalent to those of the battery of Example 10. However, it can be seen that the battery of Comparative Example 3 is inferior to the battery of Example 10 in the effect of suppressing gas generation in the battery during high-temperature storage and in the cycle life.

When the fluorinated ether (A) is used alone, the effect of suppressing gas generation during high-temperature storage is insufficient. The reason seems to be that the fluorinated ether (A) has a smaller number of fluorine atoms, and therefore is more difficult to reductively decompose at the negative electrode interface as compared with fluorinated ether (1), and it is difficult to form a protective coating. Further, when the fluorinated ether (A) is used alone, the cycle life of the battery is shorter. This is presumably because, as charging and discharging is repeatedly performed, the fluorinated ether (A) is accumulated in the positive electrode and the negative electrode, thus impeding ion diffusion in the electrodes.

The non-aqueous electrolyte of the present invention that is mainly composed of a linear carbonate and contains fluorinated ether (1) has, simultaneously at a high level, the effect of suppressing a chain of decompositions of the non-aqueous electrolyte triggered by the decomposition of the linear carbonate at the negative electrode interface, and the effect of improving the battery load characteristics. On the other hand, the non-aqueous electrolyte of the present invention that is mainly composed of a cyclic carbonate and contains the fluorinated ether (1) exhibits good wettability to a polyolefin separator, and improves the battery load characteristics that are maintained at a high level for a long period. Furthermore, the non-aqueous electrolytes of the present invention can significantly increase the battery cycle life, regardless of the type of non-aqueous solvent.

The non-aqueous electrolyte secondary battery of the present invention has good load characteristics, excellent output characteristics and charge/discharge cycle characteristics, and has a very long cycle life. Moreover, the non-aqueous electrolyte secondary battery of the present invention does not easily cause a reduction in battery performance, swelling of the battery, and the like, even if it is stored at a high temperature.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A non-aqueous electrolyte comprising a non-aqueous solvent and a lithium salt,
wherein the non-aqueous solvent contains a fluorinated ether (1) represented by Formula:

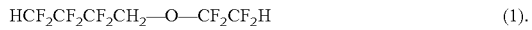  (1).

2. The non-aqueous electrolyte in accordance with claim 1, wherein said non-aqueous solvent contains 50 to 90 mol % of a linear carbonate and 5 to 25 mol % of a cyclic carbonate, and contains 5 to 25 mol % of said fluorinated ether (1).

3. The non-aqueous electrolyte in accordance with claim 2, wherein said cyclic carbonate is at least one selected from the group consisting of ethylene carbonate and propylene carbonate.

4. The non-aqueous electrolyte in accordance with claim 2, wherein said cyclic carbonate contains ethylene carbonate and propylene carbonate, and a content of said ethylene carbonate is equal to or higher than a content of said propylene carbonate.

5. The non-aqueous electrolyte in accordance with claim 2, wherein said linear carbonate is at least one selected from the group consisting of dimethyl carbonate, ethyl methyl carbonate and diethyl carbonate.

6. The non-aqueous electrolyte in accordance with claim 1, wherein said non-aqueous solvent contains 85 to 97 mol % of a cyclic carbonate, and contains 3 to 15 mol % of said fluorinated ether (1).

7. The non-aqueous electrolyte in accordance with claim 6, wherein said cyclic carbonate is at least one selected from the group consisting of ethylene carbonate and propylene carbonate.

8. The non-aqueous electrolyte in accordance with claim 6, wherein said cyclic carbonate contains ethylene carbonate and propylene carbonate, and a content of said ethylene carbonate is equal to or higher than a content of said propylene carbonate.

9. The non-aqueous electrolyte in accordance with claim 1, wherein said non-aqueous solvent contains a cyclic carbonate, said fluorinated ether (1), and at least one fluorinated ether (2) selected from the group consisting of fluorinated ethers represented by the following Formulae (2a) to (2d):

  (2a)

  (2b)

  (2c)

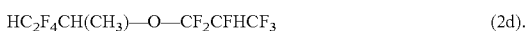  (2d).

10. The non-aqueous electrolyte in accordance with claim 9, wherein a content of said fluorinated ether (2) is 5 mol % or less of a total amount of said non-aqueous solvent.

11. The non-aqueous electrolyte in accordance with claim 9, wherein a content of said fluorinated ether (2) is 2 mol % or less of a total amount of said non-aqueous solvent.

12. The non-aqueous electrolyte in accordance with claim 9, wherein said non-aqueous solvent contains 85 to 98.5 mol % of said cyclic carbonate, contains 0.5 to 2 mol % of said fluorinated ether (1), and contains 1 to 3 mol % of said fluorinated ether (2).

13. A non-aqueous electrolyte secondary battery comprising:
a positive electrode containing a positive electrode active material;
a negative electrode containing a negative electrode active material;
a separator interposed between said positive electrode and said negative electrode; and
the non-aqueous electrolyte in accordance with claim 1.

14. The non-aqueous electrolyte secondary battery in accordance with claim 13,
wherein said separator is a polyolefin separator.

* * * * *